United States Patent
Hall et al.

(10) Patent No.: US 7,231,766 B2
(45) Date of Patent: Jun. 19, 2007

(54) HIGH PRESSURE INTENSIFYING PISTON VALVE

(76) Inventors: David R. Hall, 2185 S. Larsen Pkwy., Provo, UT (US) 84606; Timothy C. Duke, 2185 S. Larsen Pkwy., Provo, UT (US) 84606; Ronald Crockett, 2185 S. Larsen Pkwy., Provo, UT (US) 84606; Jeff Jepson, 2185 S. Larsen Pkwy., Provo, UT (US) 84606

( * ) Notice: Subject to any disclaimer, the term of this patent is extended or adjusted under 35 U.S.C. 154(b) by 102 days.

(21) Appl. No.: 11/161,875

(22) Filed: Aug. 19, 2005

(65) Prior Publication Data
US 2007/0040140 A1    Feb. 22, 2007

(51) Int. Cl.
*F15B 7/00* (2006.01)
*F16J 15/00* (2006.01)

(52) U.S. Cl. .............................. 60/560; 60/563; 60/591; 277/534

(58) Field of Classification Search .................. 60/560, 60/563, 565, 591; 277/511, 529, 530, 531, 277/532, 534
See application file for complete search history.

(56) References Cited

U.S. PATENT DOCUMENTS

| | | | | |
|---|---|---|---|---|
| 2,580,353 A | * | 12/1951 | Hunt | 60/563 |
| 4,328,671 A | | 5/1982 | Pattison | |
| 4,630,636 A | * | 12/1986 | Cutcher | 277/530 |
| 5,218,821 A | | 6/1993 | Beneteau | |
| 5,297,383 A | | 3/1994 | Mackay | |
| 6,336,802 B1 | | 1/2002 | Hall | |

\* cited by examiner

*Primary Examiner*—Michael Leslie
(74) *Attorney, Agent, or Firm*—Cameron Snedden; Tyson Wilde

(57) ABSTRACT

The present invention includes a piston valve for charging and discharging a first fluid chamber. The piston valve includes a piston shaft and a ring comprising a seal element. The piston shaft has a first end and a second end with the first end including a counter bore having at least one vent. The ring is disposed within a cylinder and the seal element is disposed intermediate the piston shaft and the ring. The piston valve may be used for intensification purposes such as in a high pressure high temperature hydraulic cartridge.

16 Claims, 11 Drawing Sheets

HIGH PRESSURE INTENSIFYING PISTON VALVE

BACKGROUND OF THE INVENTION

The invention relates to a piston valve for charging and discharging fluid in a fluid chamber. In a preferred embodiment of the invention, the piston valve is used in a high pressure high temperature environment, (HPHT) specifically HPHT press apparatuses. For example, such presses are useful in the superhard materials production industry. Some examples of superhard materials high pressure high temperature presses produce and sinter include cemented ceramics, diamond, polycrystalline diamond, and cubic boron nitride. HPHT press apparatuses typically require significant structural mass to withstand the ultra high pressures essential to synthetically form superhard materials. Various press designs are known in the art of superhard materials production and have employed assorted concepts to contain the immense reaction forces that are required to process superhard materials. For example, U.S. Pat. Nos. 2,918,699 and 3,913,280 disclose a tie-bar frame press design. Generally, the tie bar press relies on press mass largely to prevent press rupture during press cycle in which bending moments of the tie bars become great. In conventional tie-bar press systems, the length and diameter of the piston cylinders are proportional to the overall size of the press, and the hydraulic fluid must be pumped to the press at pressures ca. 10,000 p.s.i. or more which require specially made high-pressure pumps, hoses, and fittings. The high internal pressures of a reaction cell required to produce superhard materials necessitates a large amount of force applied to reaction cell faces. Because the piston cylinders of a tie bar press design generally operate jointly and at the same pressures thus producing the same force on a reaction cell, only equilateral polyhedron type reaction cells are possible.

A modern HPHT press apparatus comprises a unitary frame and six removeable high-pressure cartridges. A cartridge for a prior art unitary frame press apparatus comprises a low-pressure chamber and a high-pressure chamber joined by a cylindrical passageway. A "T" shaped intensifying piston having an axial through bore is disposed in the passageway with its large diameter end in the low-pressure chamber and its small diameter end in the high-pressure chamber. The area differential of the two ends provides the intensification ratio of the piston. A hydraulic fluid manifold encloses the low-pressure chamber, and a main piston encloses the high-pressure chamber. A dagger having an axial through bore and having an outside diameter corresponding to the inside diameter of the piston's axial through bore, is attached to the manifold and inserted through the bore of the intensifying piston. The dagger extends from the manifold through the low-pressure chamber and the cylindrical passageway. The dagger also provides a fluid path between the manifold and the high-pressure chamber. As the piston moves along the dagger path through the passageway and into the high-pressure chamber, it pressurizes the fluid in the high-pressure chamber behind the main piston. By changing the diameter of the intensifying piston's axial through bore, and the corresponding outside diameter of the dagger, the area of the piston's small end is also changed, and the intensification ratio altered. Accordingly, the fluid pressure within the high-pressure chamber may be increased or decreased in order to accommodate a desired application.

The dagger in the prior art apparatus requires the use of high pressure seals and a manifold check valve to control the fluid pressure in the high pressure chamber, which may be over 40,000 psi. In time the seals degrade and the check valve is prone to contamination and failure creating a hazardous condition in the operation of the press.

The prior art presses are often classified by the tonnage of pressure they are capable of exerting on a reaction cell, the container which is inserted into the press reaction chamber that houses the sintering raw material for transformation under high pressures and temperatures into superhard materials. For example, a 3000-ton multi-axis press typically is capable of producing approximately 700,000 psi. on each face of a cubic reaction cell. During the press cycle, the reaction cell is usually subject to ultra high compressive forces and temperatures; the pressure inside the cell must reach 35 kilobars or more to produce superhard materials such as polycrystalline diamond. Simultaneously, an electrical current is passed through the cell's resistance heating mechanism raising the temperature inside the cell to above 1000° C. After the reaction cell is subject to high pressures and temperatures for a set period of time, it is quickly cooled. Pressure is then released on each side of the cell and the cell is removed from the internal reaction chamber.

The amount of compressive forces a high pressure high temperature press can exert on a given reaction cell and consequently the maximum reaction cell size and payload, are limited by the reaction forces the press can endure without catastrophic rupture. Most often, the size and mass of the press determines its threshold capabilities for tonnage before catastrophic rupture occurs. For example, the weight of a tie-bar press with a tonnage rating of 3000 tons may exceed 60 tons. The weight of a 4000-ton tie bar press may exceed 100 tons. Moreover, large tonnage press types as described above are often expensive to construct and its efficiency is typically proportional to the duration of its cycle and volume of its payload. Therefore, in general, the smaller the press mass and the shorter the duration of the pressing cycle, and the larger the reaction cell with concomitant enlarged payload volume, then the higher the economy and efficiency of the multi-axis press. Essentially, the greater reaction forces a press design can withstand at a given mass in conjunction with decreased energy consumption per cycle and increased reaction cell payload, then the manufacture of superhard materials becomes more economically viable.

BRIEF SUMMARY OF THE INVENTION

The present invention includes an intensifying piston valve for charging and discharging a first fluid chamber. The piston valve includes a piston shaft and a ring comprising a seal element. The piston shaft has a first end and a second end with the first end comprising a counter bore having at least one vent. Preferably the counter bore of the piston valve may have a plurality of vents. The ring is disposed within a cylindrical passageway and the seal element is disposed intermediate the piston shaft and the ring.

One embodiment of the invention also includes a hydraulic cartridge for a high pressure high temperature press apparatus. The hydraulic cartridge comprises a cylinder comprising a first and second fluid chamber joined by cylindrical passageway formed within the cylinder. An intensifying piston valve comprising a piston shaft with a first and second end has a counter bore adjacent the first end exposed within the first fluid chamber. The counter bore comprises a plurality of vents providing openings between the outer piston shaft surface and the inner counter bore surface. A ring coaxially encompassing the piston shaft is disposed within the cylindrical passageway intermediate the first and second fluid chambers. A working end comprising a main piston connected to an anvil encloses a truncated conical section of the cylinder. The main piston is disposed within the first fluid chamber. A plurality of tie rods disposed within the cylinder and truncated conical section connects the piston and a hydraulic end of the cartridge. A hydraulic end comprises a back plate connected to a hydraulic manifold proximate the end of the cylinder opposite the truncated conical section with the manifold enclosing the second fluid chamber. Hydraulic fluid is circulated via the manifold within the first and second fluid chambers.

BRIEF DESCRIPTION OF THE DRAWINGS

The foregoing and other features of the present invention will become more fully apparent from the following description, taken in conjunction with the accompanying drawings. The invention will be described with additional specificity and detail through use of the accompanying drawings with the understanding that these drawings depict only typical embodiments in accordance with the invention and are therefore not to be considered limiting in scope.

DETAILED DESCRIPTION OF THE INVENTION AND THE PREFERRED EMBODIMENT

It will be readily understood that the components of the present invention, as generally described and illustrated in the Figures herein, may be arranged and designed in a variety of different configurations. Thus, the following detailed description of embodiments of the present invention, as represented in the Figures, is not intended to limit the scope of the invention, but is merely representative of various selected embodiments of the invention. The embodiments of the invention will be best understood by reference to the drawings wherein like parts are designated by like numerals throughout. Similar features are shown and referred to in each drawing by number, though not necessarily always described under the Figure heading below.

Figure 1:
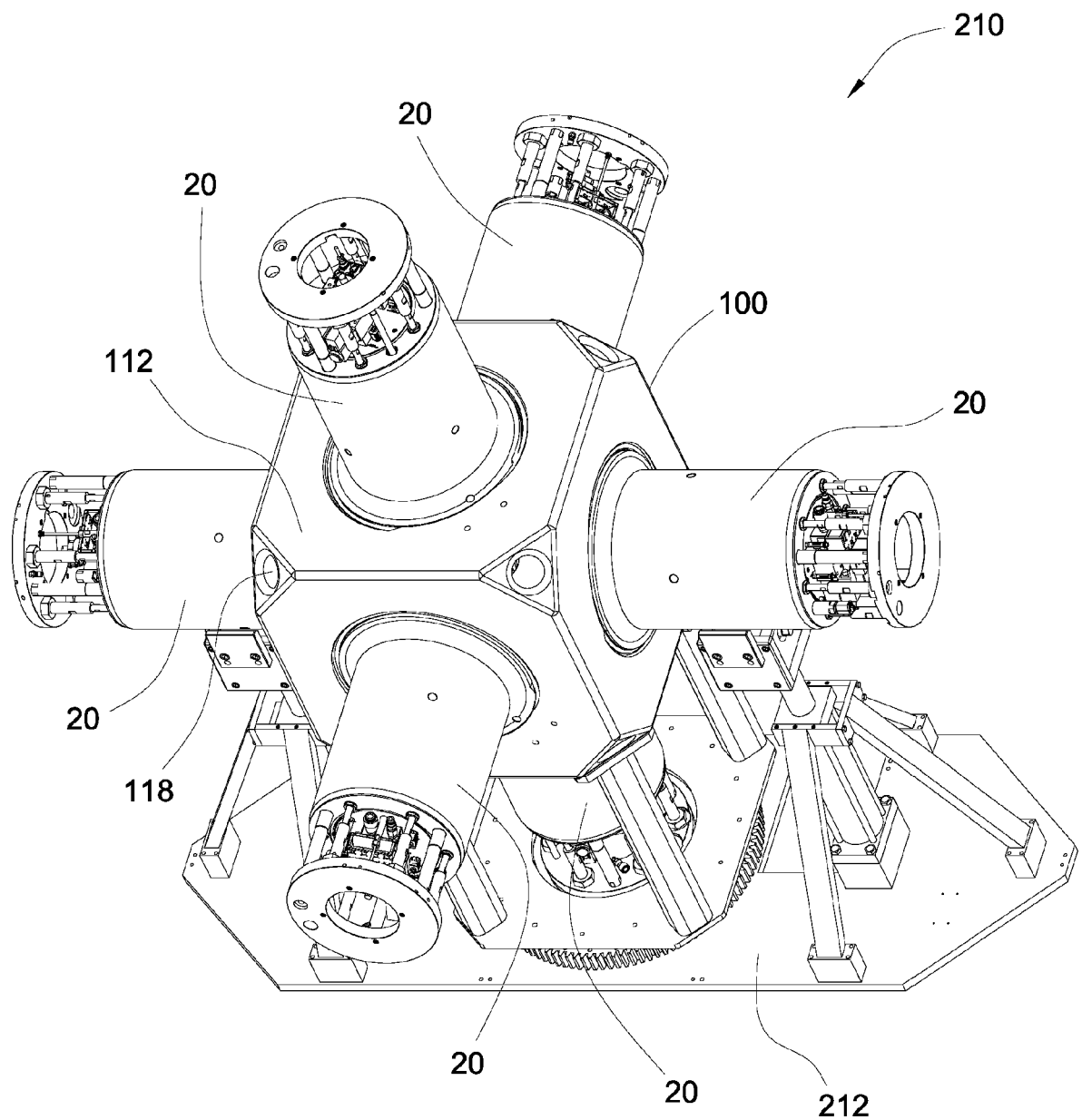
FIG. 1 is a perspective diagram of a high pressure high temperature press apparatus including a unitary frame and six hydraulic cartridges.

Referring to the drawings, a perspective view of a high pressure high temperature press apparatus 210 is shown in FIG. 1. In a preferred embodiment of the invention, the high pressure high temperature press apparatus 210 includes a unitary frame 100 and six hydraulic cartridges 20. The high pressure high temperature press apparatus rests on a base 212 for support, ease of repair and assembly of the press. The unitary frame 100 has an outer surface 112 and secondary boreholes 118 between the outer surface 112 and inner reaction chamber 114, shown in FIG. 2.

Figure 2:
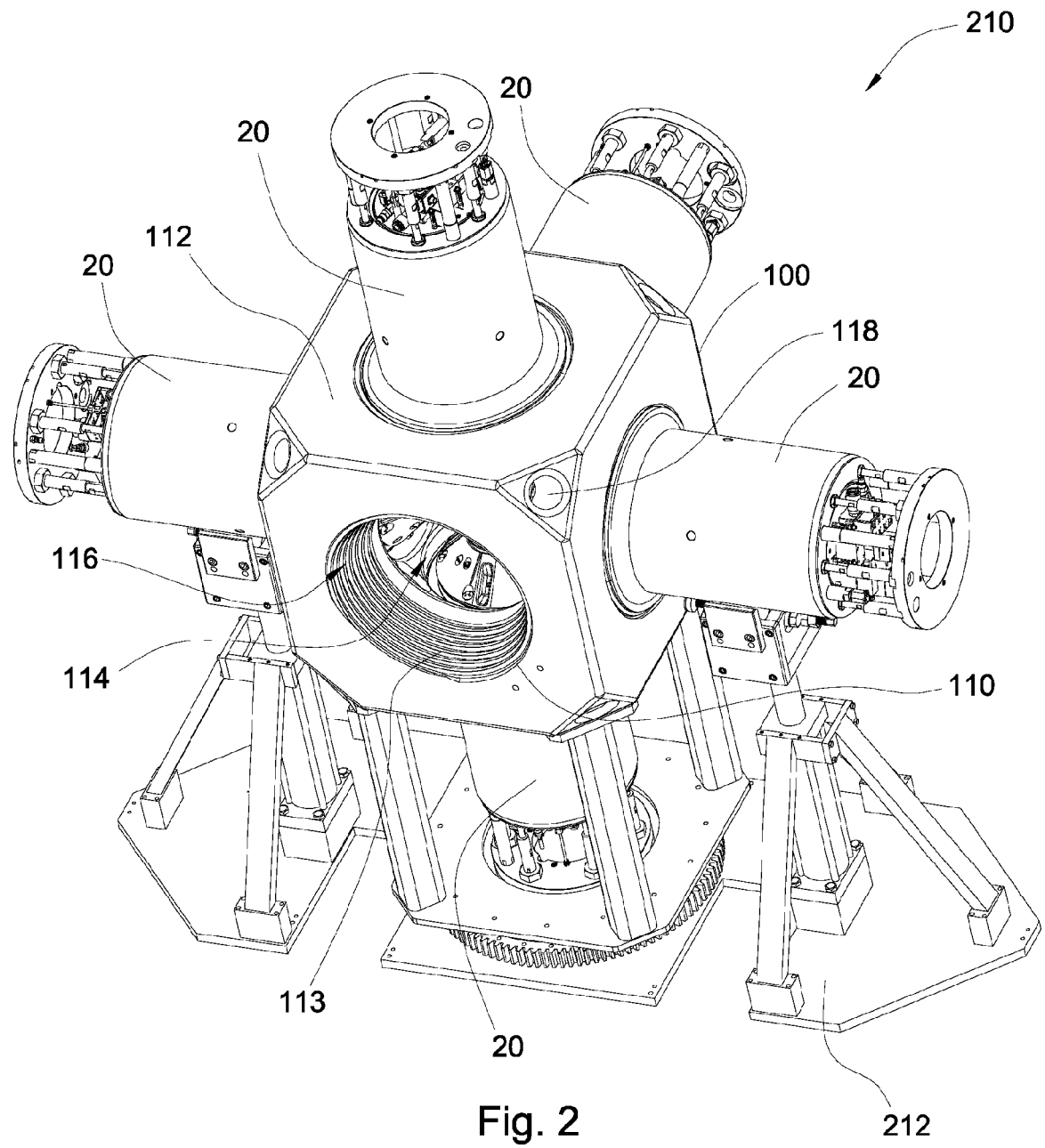
FIG. 2 is a perspective diagram the same press apparatus as in FIG. 1 with a hydraulic cartridge removed.

FIG. 2 is a perspective view of the same high pressure high temperature press apparatus 210 as in FIG. 1 with a hydraulic cartridge 20 removed. The unitary frame 100 comprises an inner reaction chamber 114. A substantially coaxial opening 110 has internal threads 113 extending axially substantially between the outer surface 112 and inner reaction chamber 114. The internal threads 113 taper 116 towards the inner reaction chamber 114. At least one secondary borehole 118 is between the inner chamber 114 and outer surface area 112. The internal threads 113 are adapted to mate with the tapered threads of hydraulic cartridge 20.

Figure 3:
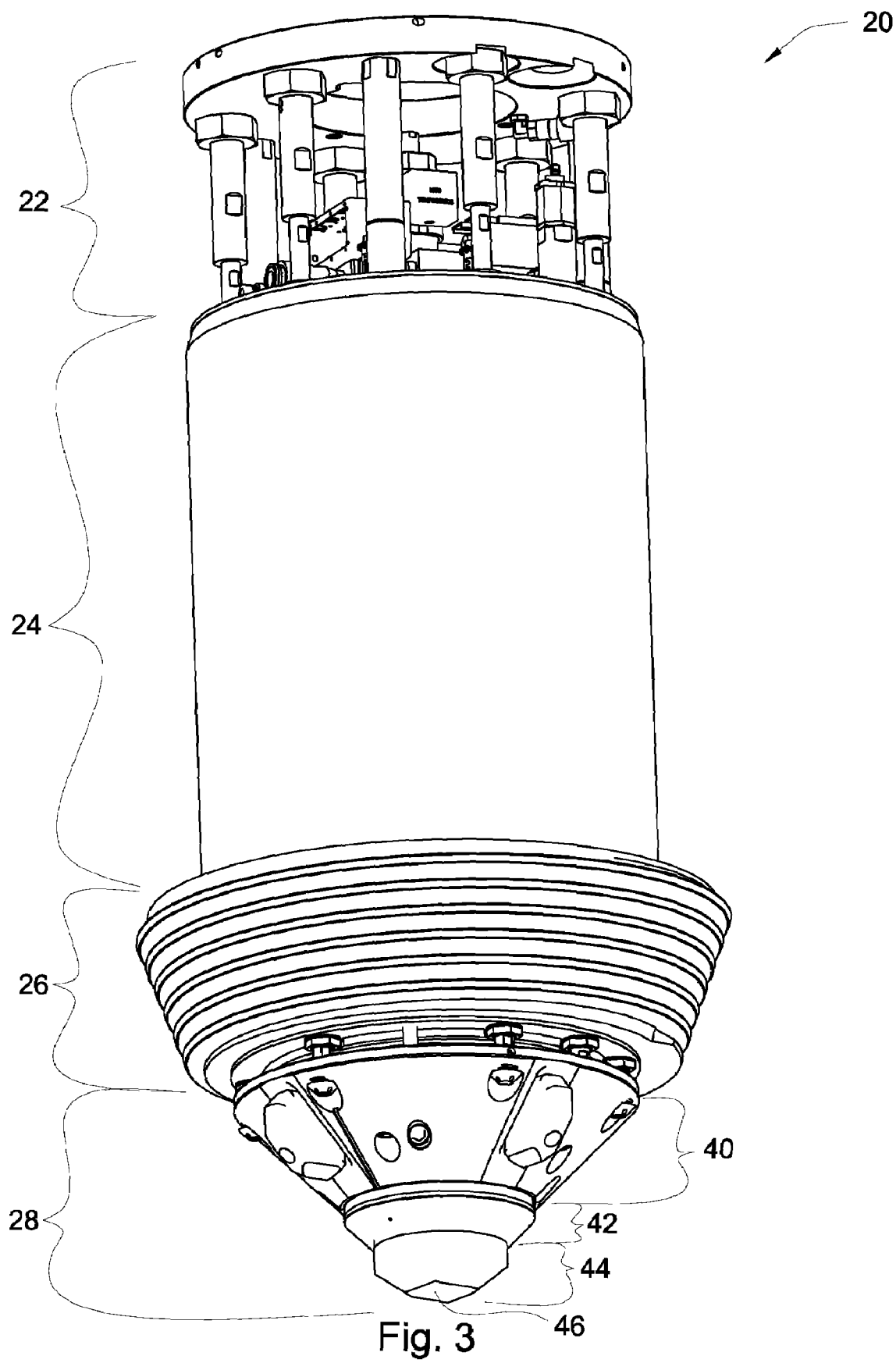
FIG. 3 is a free standing hydraulic cartridge including a working end and a hydraulic end.

Turning now to FIG. 3, a free standing hydraulic cartridge 20 includes a hydraulic end 22 and working end 28. The hydraulic cartridge comprises a truncated hollow conical section 26 and a cylinder 24. The working end 28 has three primary constituents, a key ring 40, a binding ring 42, and an anvil 44. In operation, the six anvil faces 46 impinges on the corresponding faces of a reaction cell during the press cycle elevating the internal pressure of the reaction cell to a level conducive to sintering and producing superhard materials. The hollow portion of the conical section is not shown in this Figure but is discernible in later Figures as the first fluid chamber 50.

Figure 4:
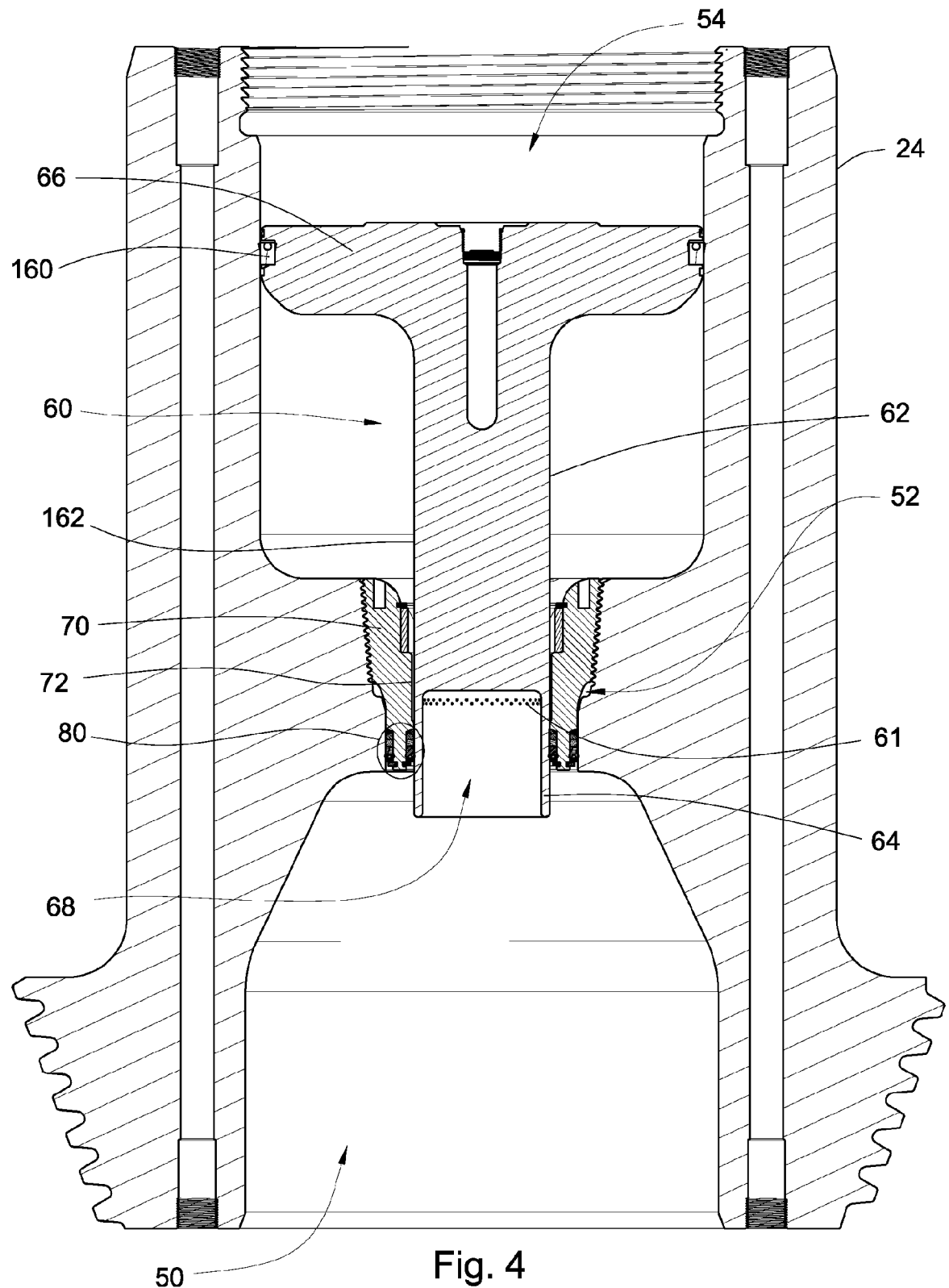
FIG. 4 is a cross-sectional diagram of a cylinder with a ring and piston valve shown.

FIG. 4 is a cross-sectional diagram of a hydraulic cartridge 20 similar to the cartridge 20 shown in FIG. 3 without the working end 25, hydraulic end 27, or various internal components to more easily and clearly describe the present invention. An intensifying piston valve 60 for charging and discharging a first fluid chamber 50 is shown inside a cylinder 24. The piston valve 60 includes a piston shaft 62 comprising a first end 64 and a second end 66. The first end 64 includes a counter bore 68 having at least one vent 61. A ring 70 comprising a seal element 80 is disposed within the cylindrical passageway 52 such that the seal element 80 is disposed intermediate the piston shaft 62 and the ring 70. In a preferred embodiment, the ring 70 is threaded into the cylinder 24 within the cylindrical passageway 52 intermediate the first fluid chamber 50 and a second fluid chamber 54. The first end 64 of the piston valve 60 preferably extends into the first fluid chamber 50. In a preferred embodiment, the piston valve is used for fluid intensification purposes. In that environment, the piston valve in essence becomes a fluid intensification piston valve permitting fluid to pass between the two fluid chambers 50 and 54 until the fluid pathway between the two fluid chambers is closed when fluid intensification is desired. Because the ring 70 can be easily changed for a different size, the piston valve 60 becomes interchangeable with different size piston valves for different fluid intensification levels. The seal element 80 forms a seal between the piston shaft outer diameter 162 and the ring inside diameter 72. The piston valve 60 is preferably made of metal and various alloys such as steel or stainless steel. For example, forged 4140HT is a preferable material choice.

Figure 5:
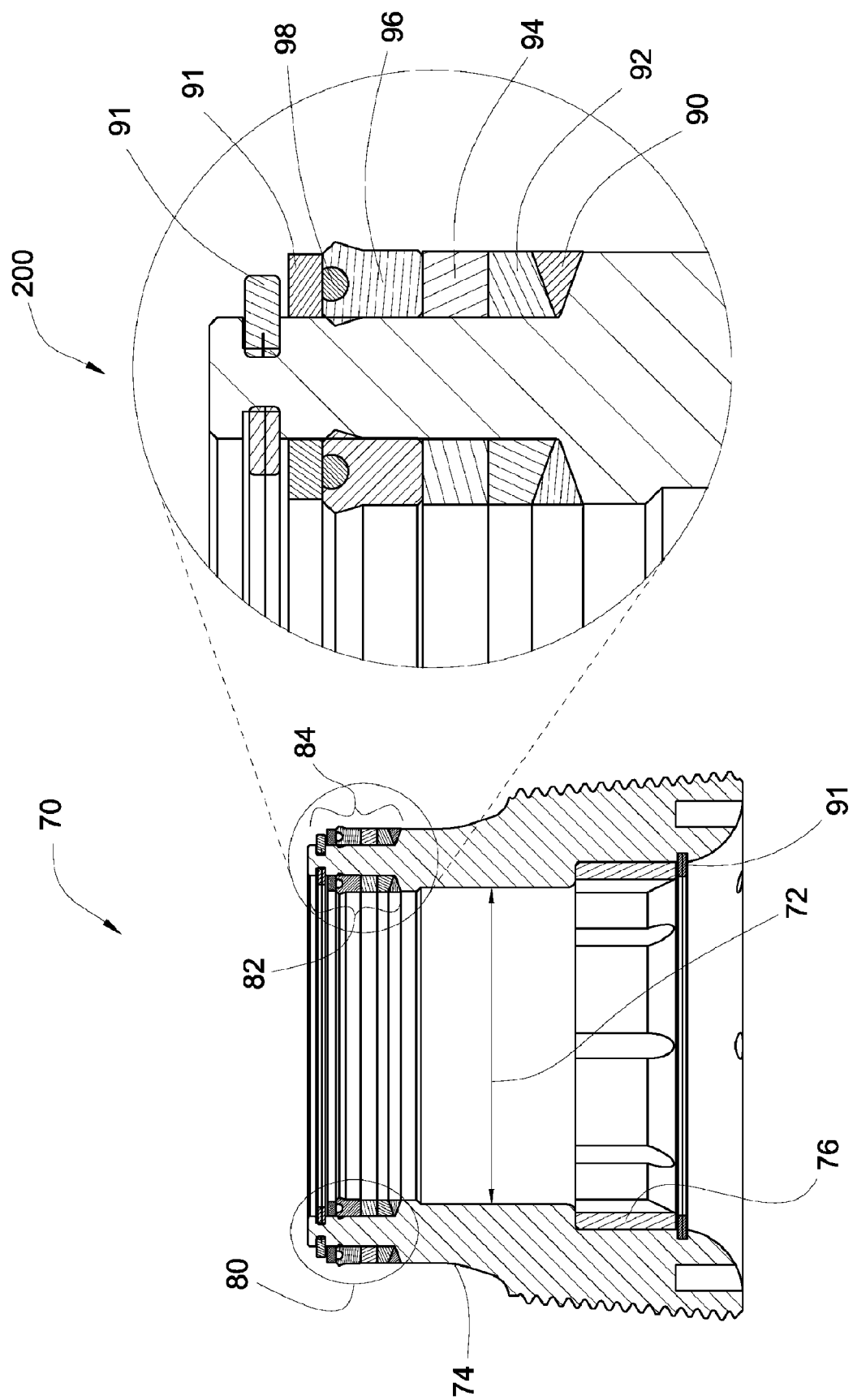
FIG. 5 is a cross-sectional diagram of a ring and a detailed diagram of the seal element.

FIG. 5 is a cross-sectional diagram of the ring 70 and a detailed diagram of the seal element 80. The ring has an outer diameter 74 and an inside diameter 72. The seal element 80 preferably comprises a first seal 82 and a second seal 84. The first seal 82 forms a seal between the piston shaft outer diameter (not shown) and the ring inside diameter 72. The second seal 84 forms a seal between the ring outside diameter 74 and the cylindrical passageway 52 intermediate the first and second fluid chambers as shown in FIG. 4. Enlargement 200 details the seal element components. The seal element 80 comprises an angled modular back 92 up lying adjacent an anti-extrusion ring 90, a modular back up 94 lying adjacent the angled modular back up 92, a Y-shaped seal ring 96 lying adjacent the modular back up 94, and a seal ring 98 lying adjacent the Y-shaped seal ring 96. At least one retention ring 91 mechanically engages the ring 70 and is adjacent the seal ring 98. In a preferred embodiment, two retention rings are employed to ensure the placement of the seal element and its components. The ring 70 may also include a bearing surface 76 to reduce friction and extend life of the ring 70. Another retention ring 91 may be used to retain the bearing surface 76 in a desired position. The ring 70 is preferably made of metal and various metal alloys such as steel and stainless steel. For example, the ring 70 may be made of EN30B or 4340HT. The bearing surface 76 is preferably made of metal and metal alloys. For example, the bearing surface may be made of bronze alloys such as SAE 660 bronze, graphite filled SAE 660 bronze, and SAE 841 bronze.

A material property under consideration in choosing a suitable material for the seal element is the hardness as measured on a Shore A scale. Increasing the hardness of the elastomeric material decreases its tendency to flow under high pressures thus decrease its likelihood of extrusion. The seal element 80 preferably comprises a material having a minimum hardness of between 60 and 90 durometer on a Shore A hardness scale.

Some example of the types of materials the seal element may be made of include perfluoroelastomers, fluoroelastomers, acrylonitrile butadiene, highly saturated nitrile elastomer compounds, carboxylated nitrile compounds, polyester elastomer, ethylene propylene rubber, polyether ether ketone, glass filled polyether ether ketone, carbon filled polyether ether ketone, polyether ketone ketone, glass filled polyether ketone ketone, mineral filled polyether ketone ketone, and carbon filled polyether ketone ketone. In particular, the Y-shaped seal ring 96, often termed a lip seal, is preferably made from elastomeric material such as perfluoroelastomers, fluoroelastomers, acrylonitrile butadiene, highly saturated nitrile elastomer compounds, carboxylated nitrile compounds, polyester elastomer, and ethylene propylene rubber. The term elastomer should be understood to represent a material that has relatively no yield point and generally has a low glass transition temperature such as an amorphous polymer that is soft and pliable at room temperature. The seal ring 98 is preferably made of elasotmeric materials that are classified according to ASTM D standard 1418 such as FFKM, FKM, NBR, XNBR and HNBR. FFKM materials are generally known as perfluoroelastomers whereas FKM materials are known as fluoroelastomers. In general, the seal ring 98 is preferably made of a nitrile elastomeric compounds, carboxylated nitrile compounds, or ethylene propylene rubber.

A stiffer material is preferable for both the modular back up 94 and angled modular back up 92 such as polyether ether ketone, glass filled polyether ether ketone, carbon filled polyether ether ketone, polyether ketone ketone, glass filled polyether ketone ketone, mineral filled polyether ketone ketone, and carbon filled polyether ketone ketone. The anti-extrusion ring 90 helps to ensure seal integrity at high pressures and thus may be made of stiffer material than the modular back ups 94, 92. Some examples are manganese bronze, bronze, and various copper alloys. Specifically, manganese bronze 675 hardened is preferable along with copper casting alloys such as UNS C86100 or UNS C86200.

Figure 6:
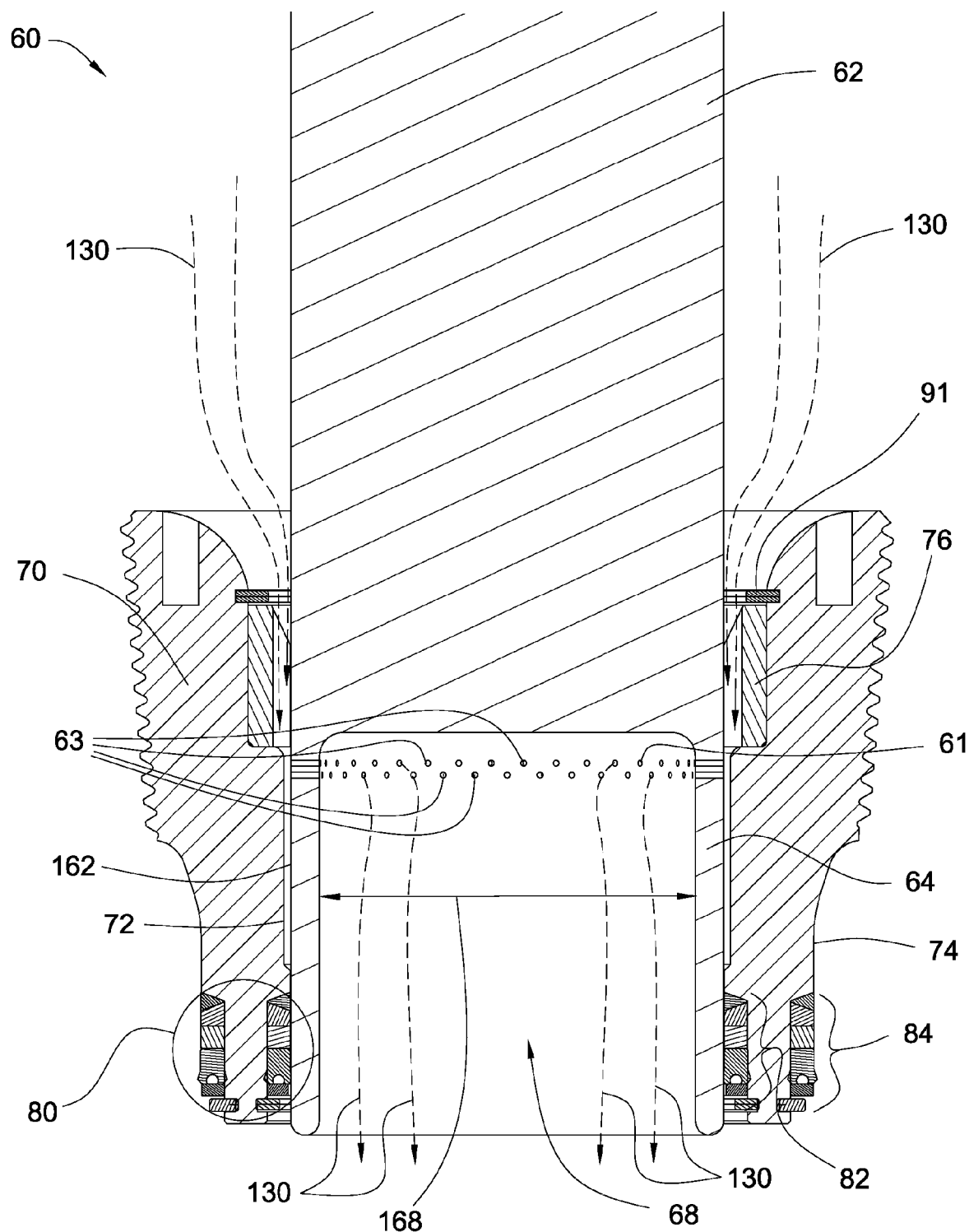
FIG. 6 is a cross-sectional diagram depicting the fluid flow through a piston valve vents and ring.

FIG. 6 is a cross-sectional diagram depicting the fluid flow through a piston valve and ring. Hydraulic fluid passes between the first and second fluid chambers (not shown) through the piston valve 60 and ring 70. The fluid pathway, depicted by flow lines 130, passes between the piston shaft 62 and the ring inside diameter 72. Because the seal element 80 forms an unbroken seal between the piston shaft 62, in particular the first end 64, the fluid cannot pass the first end 64 of the piston valve 60. Neither can fluid pass by the second seal 84 because a seal is formed between the ring outside diameter 74 and a passageway in the cylinder (not shown). Instead, the fluid flows through at least one vent 61 in the first end 64. Preferably, the first end 64 comprises a plurality of vents 63 through which hydraulic fluid flows into a counter bore 68 formed in the first end 64. The vents 61, 63 are positioned between the outside piston shaft diameter 162 and the counter bore diameter 168. Thus, the vents are in fluid communication with the first and second chambers. The first fluid chamber is subsequently charged with hydraulic fluid as long as the plurality of vents 63 do not pass the seal element 80, in particular the first seal 82 between the piston shaft outside diameter 162 and ring inside diameter 72. As will be shown in more detail, the piston valve 60 disrupts and terminates fluid flow between the first and second fluid chambers as the plurality of vents 63 pass by the seal element 80. The ring 70 may also include a bearing surface 76 to reduce friction between the ring 70 and piston valve 60 thus extending the life of the ring 70 and piston shaft 62. Another retention ring 91 may be used to retain the bearing surface 76 in a desired position.

Figure 7:
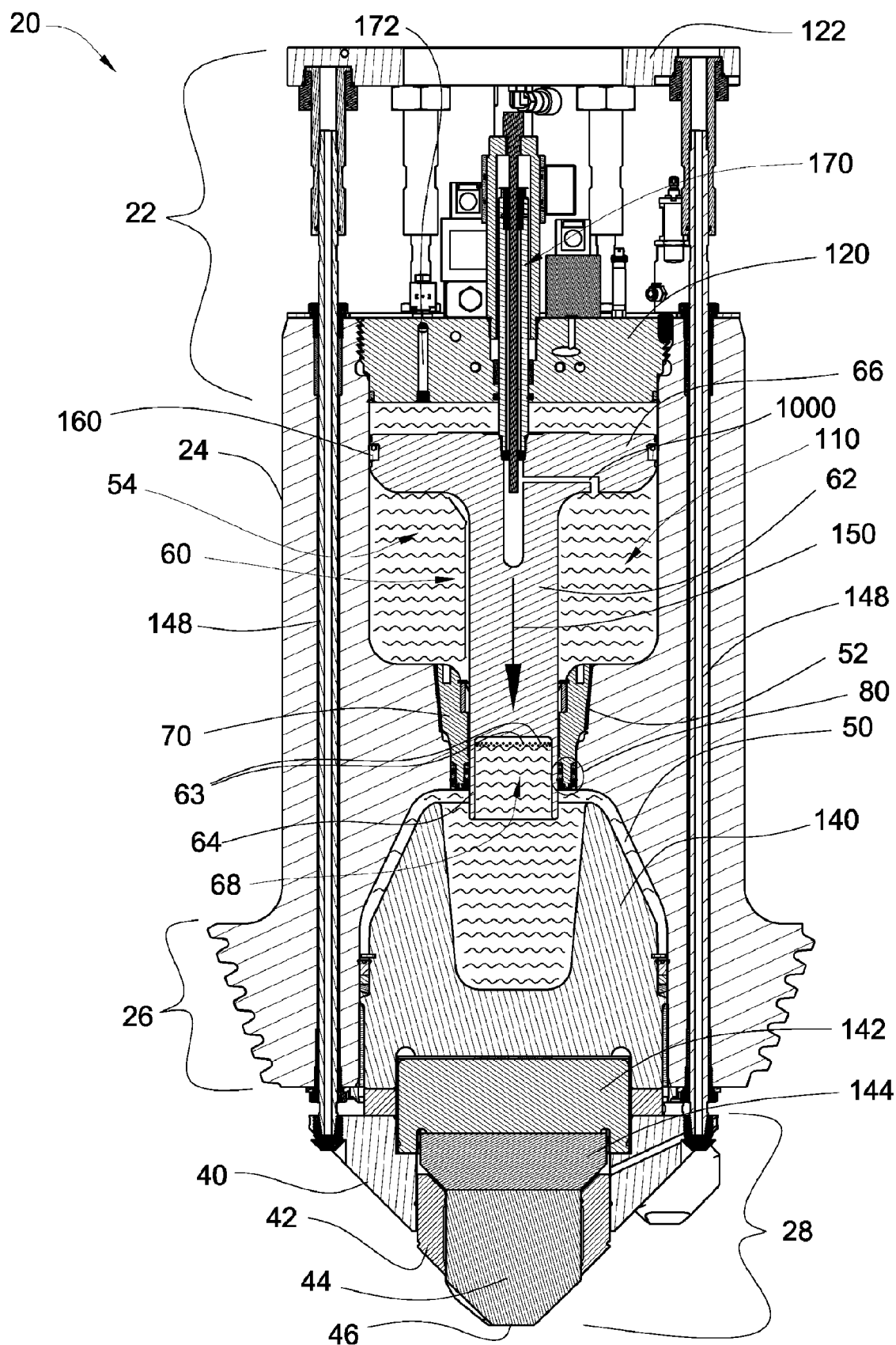
FIG. 7 is a cross-sectional diagram of a piston valve in a retracted position within a HPHT hydraulic cartridge.

Turning now to FIGS. 7-10, the movement of the piston valve is shown as well as the intensification and release of hydraulic fluid in the first fluid chamber 50. In each of the drawings like numbers depict like components unless otherwise noted. FIG. 7 is a cross-sectional diagram of a piston valve 60 in a retracted position within a HPHT hydraulic cartridge 20. A hydraulic cartridge 20 includes a hydraulic end 22 and working end 28. The hydraulic cartridge comprises a truncated hollow conical section 26 and a cylinder 24. The working end 28 has three primary constituents, a key ring 40, a binding ring 42, and an anvil 44. The anvil face 46 cooperates with opposed anvil faces of the five remaining cartridges 20 and compresses against a reaction cell face during the press cycle elevating the internal pressure of the reaction cell to a level conducive to sintering and producing superhard materials. The hydraulic end 22 further includes a manifold 120 through which hydraulic fluid, lines and equipment pass as necessary. Tie rods 148 connect the back plate 122 to the working end 28, in particular the key ring 40. A main piston 140 placed within the first fluid chamber 50 encloses the first fluid chamber and is connected to the working end 28 with a top spacer 144 adjacent a bottom spacer 142 in between the piston 140 and working end 28, in particular the key ring 40. A piston valve 60 comprises a piston shaft 62 with a first and second end, 64 and 66, respectively. The first end 64 further includes a counter bore 68 preferably with a plurality of vents 63 between the piston shaft outside diameter and the counter bore diameter. The second end 66 is preferably disc shaped. However, the exact shape of the second end 66 may depend on the corresponding diameter of the second chamber 54.

The piston valve 60 is in a retracted position capable of extending in a direction 150 as depicted by the arrow. When in a retracted position, the second end 66 of the piston valve 60 is positioned proximate the manifold 120. The first end 64 of the piston valve 60 extends into the first fluid chamber 50. The ring 70 is disposed within a passageway 52 intermediate the first chamber 50 and second chamber 54. Preferably, the ring 70 is threaded into corresponding threads along the passageway surface. The seal element 80 prevents fluid to flow between the passageway 52 and the two fluid chambers 50, 54. Instead, fluid flows between the first and second chamber through the plurality of vents 63 and the counter bore 68. A seal 160 along the perimeter of the second end 66 prevents hydraulic fluid 110 from passing between the diameter of the second fluid chamber 54 and the perimeter of the second end 66. When the piston valve 60 is in a retracted position, the vents 63 are between the second fluid chamber 54 and the seal element 80 permitting fluid to pass between both fluid chambers 50 and 54. The piston 140 may move into an extended position, denoted by arrow 180. Fluid flows through a hydraulic line 170 and into the piston valve 60, through a port 1000, into the portion of the second chamber 54 between the second end 66 and the ring 70, into the space between the piston shaft 62 and ring 70, through the vents 63, filling the counter bore 68 and consequently the first fluid chamber 50.

Figure 8:
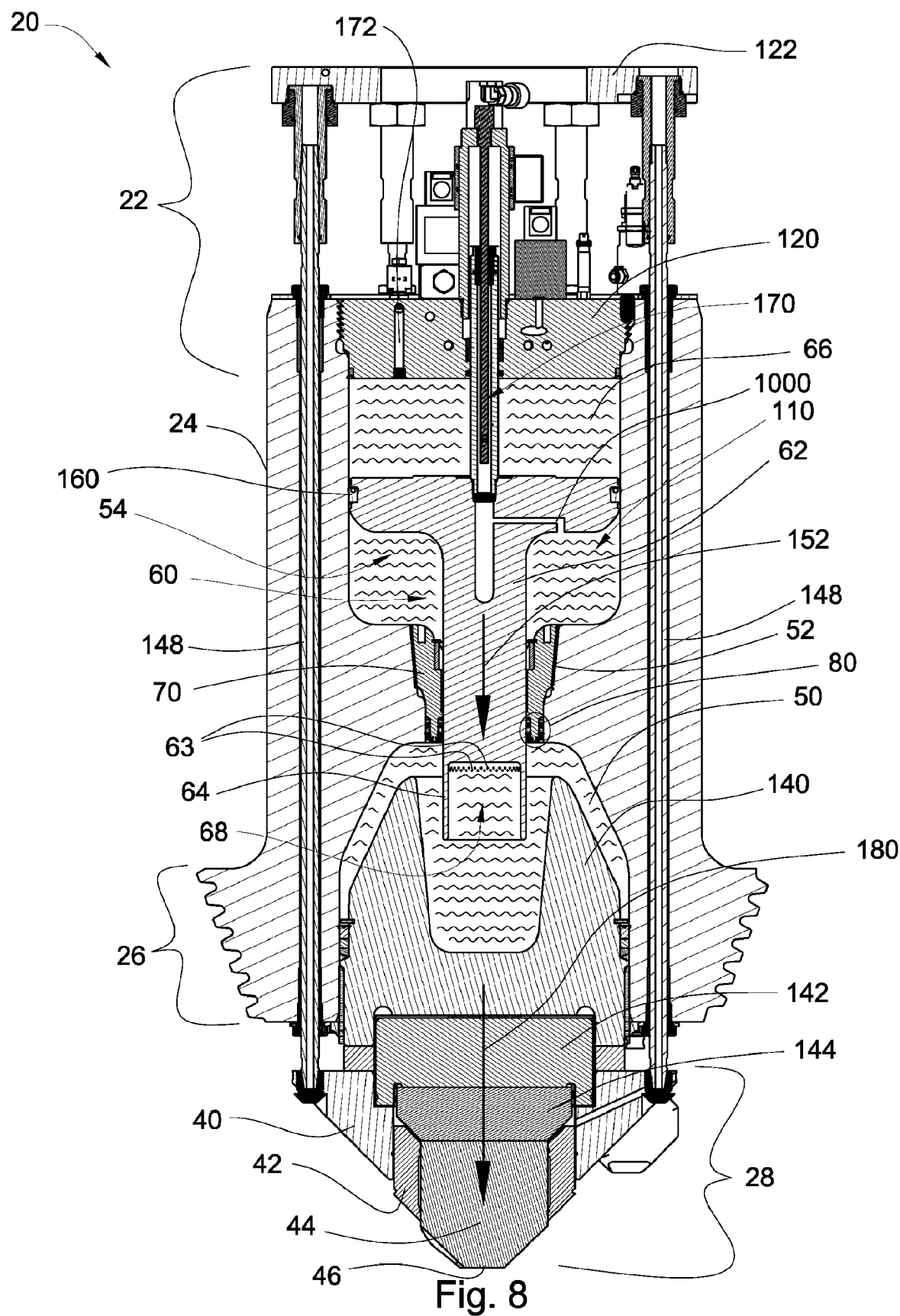
FIG. 8 is a cross-sectional diagram of a piston valve in FIG. 7 moving to an extended position from a retracted position.

FIG. 8 is a cross-sectional diagram of a piston valve in FIG. 7 moving to an extended position from a retracted position as depicted by the arrow 152. The piston valve 60 moves forward, denoted by arrow 152, as the second fluid chamber 54 fills between the second end 66 and the manifold 120 with hydraulic fluid 110 through a manifold opening 172 causing the piston valve 60 to move into an extended position depicted by arrow 152. As the vents pass the seal element 80, fluid communication between the two chambers cease and the first fluid chamber 50 discontinues filling with fluid 110. Hydraulic fluid in the portion of the second chamber 54 between the second end 66 and the ring 70 passes through a port 1000 in the second end 66 of the piston valve 60 and back into the hydraulic line 170. The movement of the piston 140 causes the working end 28 to extend until the anvil face 46 compresses against a reaction cell face (not shown).

Figure 9:
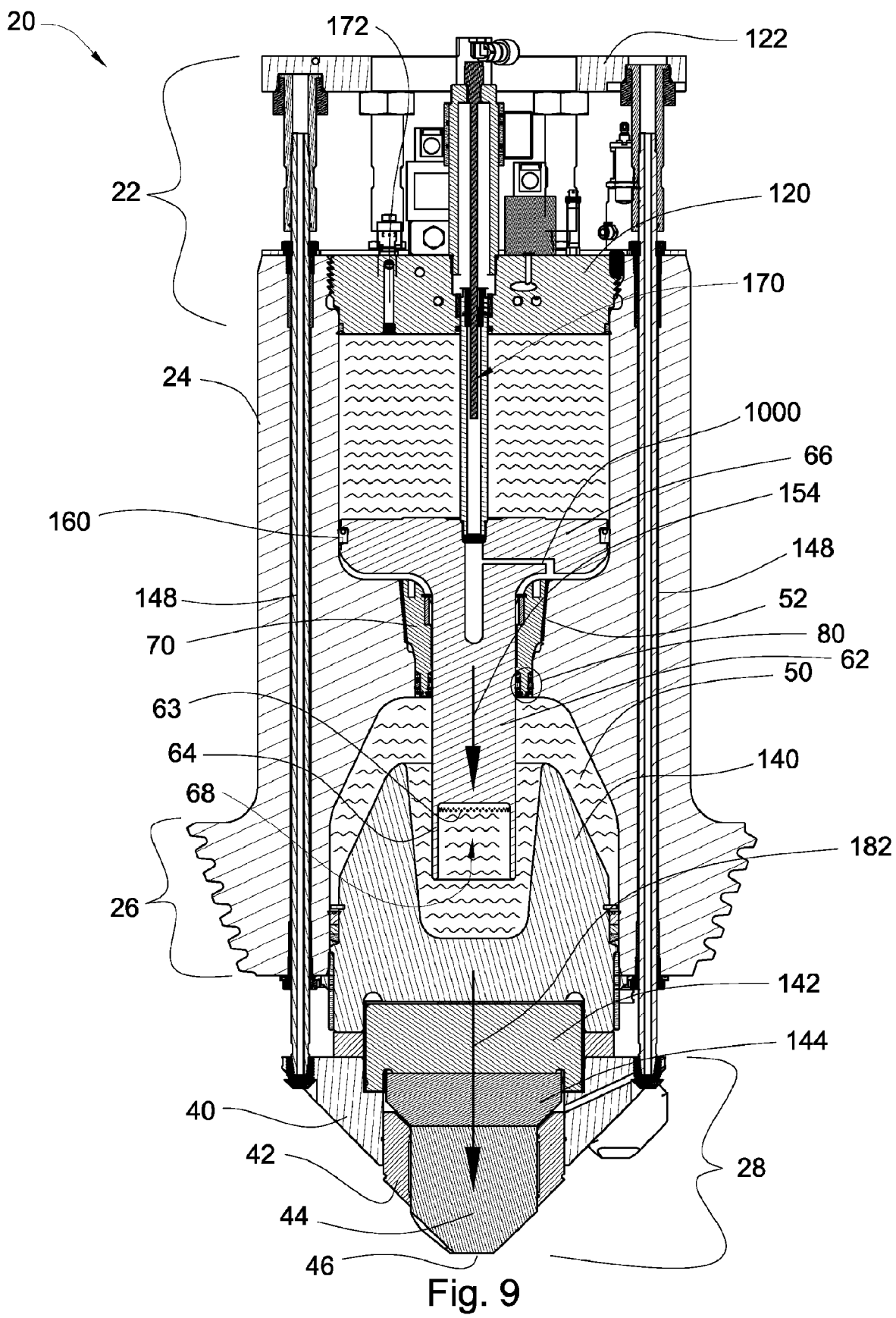
FIG. 9 is a cross-sectional diagram of a piston valve in FIG. 8 in an extended position.

FIG. 9 is a cross-sectional diagram of a piston valve in FIG. 8 in an extended position depicted by the arrow 154. As the vents 63 pass the seal element 80 and hydraulic fluid 110 continues to fill the second fluid chamber 54 between the second end 66 and the manifold 120, the piston valve 60 intensifies the fluid 110 in the first fluid chamber 50. The fluid is intensified to a maximum pressure when the piston valve 60 reaches a fully extended position 154 causing the piston 140 and anvil 44 to exert maximum force against the reaction cell as depicted by arrow 182. The anvil face 46 compresses against a reaction cell face during the press cycle elevating the internal pressure of the reaction cell to a level conducive to sintering and producing superhard materials.

Figure 10:
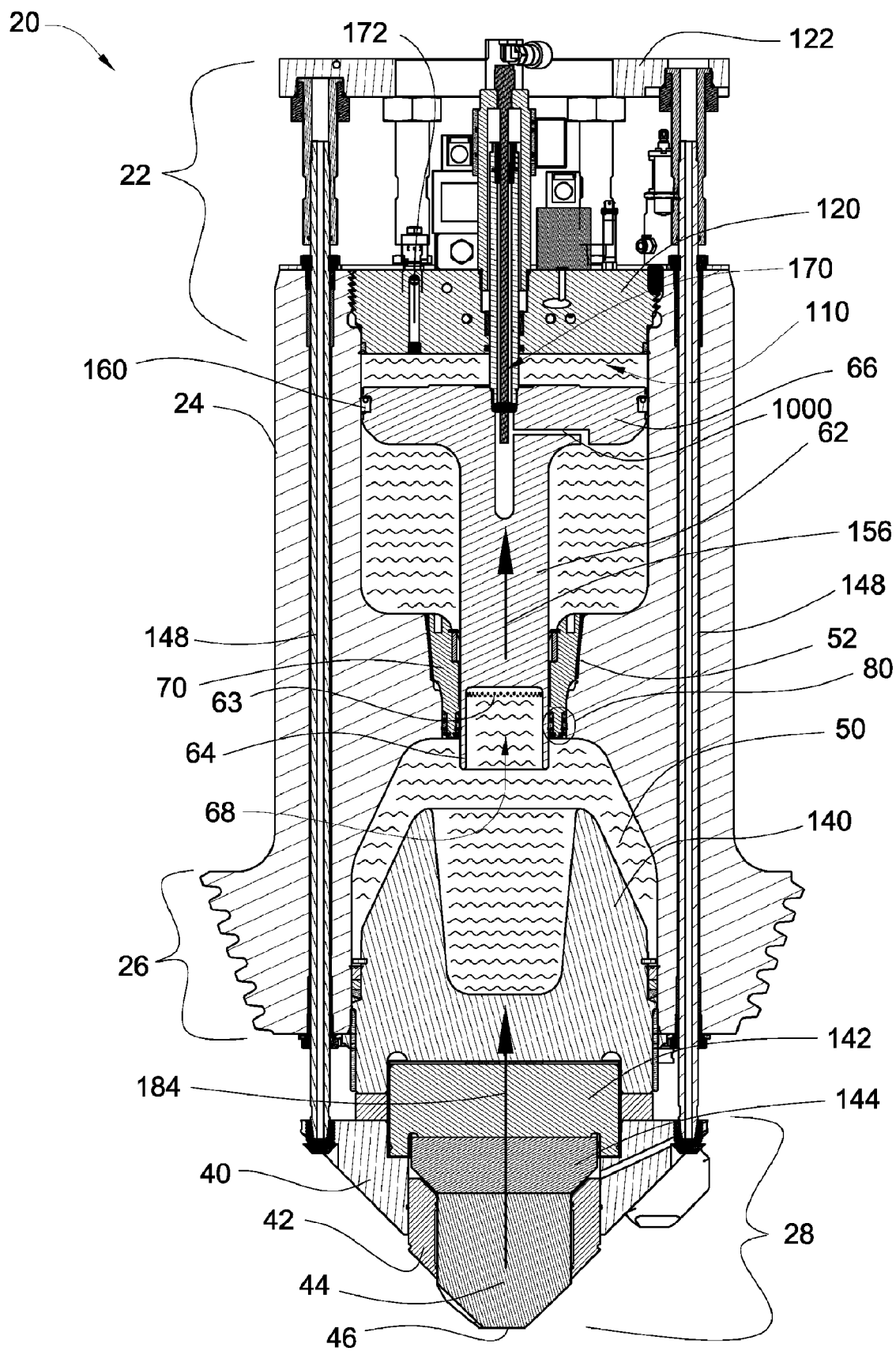
FIG. 10 is a cross-sectional diagram of a piston valve in FIG. 9 moving from an extended position to a retracted position.

FIG. 10 is a cross-sectional diagram of a piston valve in FIG. 9 moving from an extended position back to a retracted position. The working end 28 retracts from the reaction cell face, denoted by arrow 184, as the pressurized fluid in the first chamber 50 is depressurized when the piston valve retracts. Hydraulic fluid 110 is exhausted through the manifold opening 172 as fluid fills the portion of the second chamber 54 between the second end 66 and the ring 70 when hydraulic fluid passes through the hydraulic line 170 and into a port 1000 in the second end 66 of the piston valve 60.

Consequently, the piston valve 60 retracts as denoted by the arrow 156. Complete depressurization of the hydraulic fluid 110 in the first chamber 50 occurs as the plurality of vents 63 pass the seal element 80 of the ring 70. The first and second fluid chambers 50, 54 are again in fluid communication with each other through the vents 63 in the counter bore 68.

Figure 11:
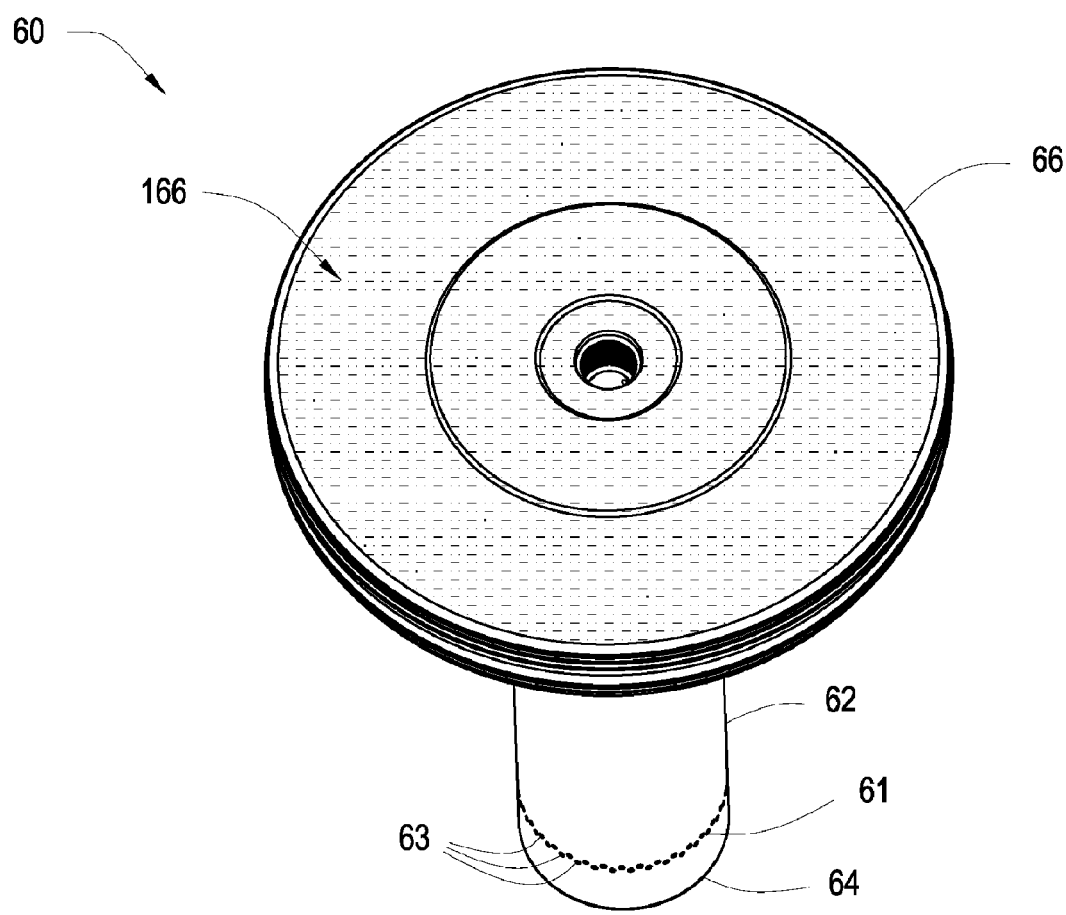
FIG. 11 is a perspective diagram of a piston valve second end.
Figure 12:
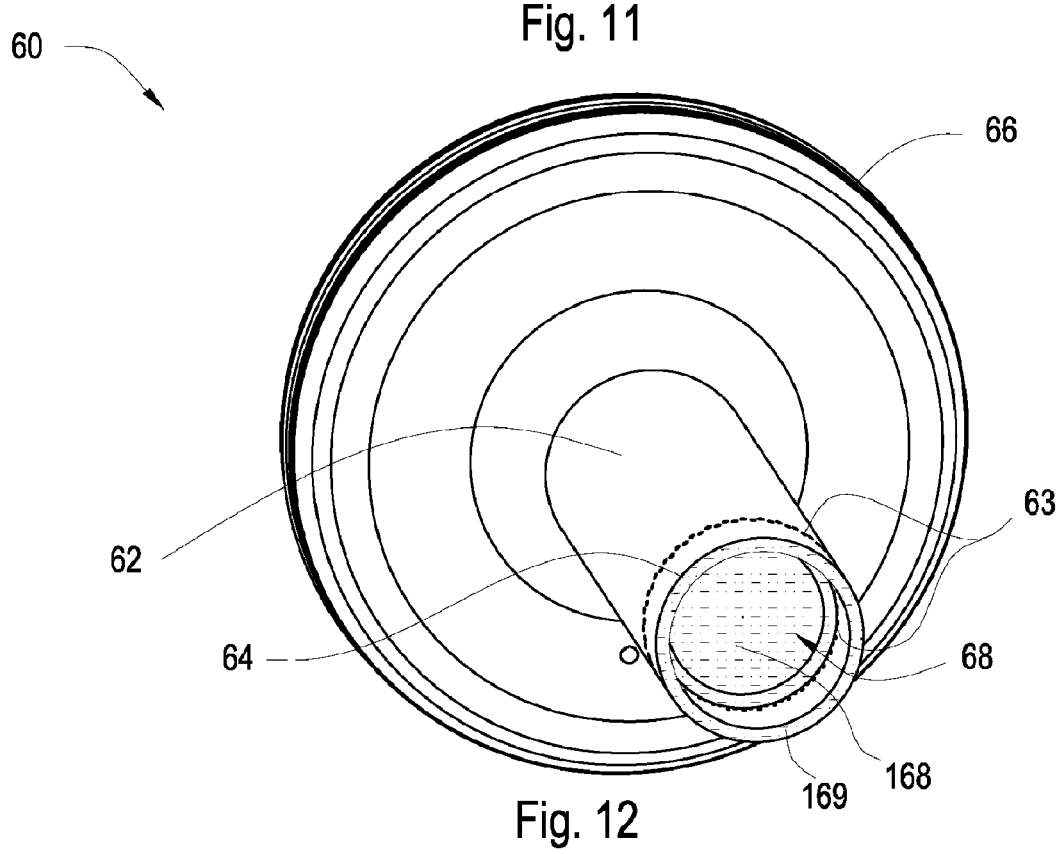
FIG. 12 is a perspective diagram of a piston shaft counter bore.

Turning to FIGS. 11 and 12, an intensification ratio between the first and second end 64 and 66 is depicted. Like features in previous drawings are included in FIGS. 11 and 12 with like labels. FIG. 11 is a perspective diagram of a second end 66 of the piston valve 60 with a corresponding surface area 166 denoted by the cross hatching. FIG. 12 is a perspective diagram of a piston shaft counter bore 68. The piston shaft 62 includes the first end 64 where the counter bore 68 is formed. The counter bore has a bottom surface area 168 and a lip surface area 169. These two areas are added together when determining the intensification ratio of the piston valve 60. This is done by relating the piston shaft's second end surface area 166 to the combined piston shaft's first end surface areas 168 and 169 denoted by the cross hatching. Preferably, the area 166 is at least between five and fifteen times the combined areas 168 and 169 respectively. The present invention allows a change in the intensification ratios simply by changing the ring and corresponding piston valve size as desired. Thus, only different size piston shafts are needed to create an array of possible intensification ratios without the expensive alternative of having different hydraulic cartridge cylinder sizes.

Whereas the present invention has been described in particular relation to the drawings attached hereto, it should be understood that other and further modifications apart from those shown or suggested herein, may be made within the scope and spirit of the present invention.

What is claimed is:

1. A piston valve for alternately charging and discharging axially aligned first and second fluid chambers, comprising:
    a piston shaft axially aligned within the fluid chambers comprising a first end and a second end, the first end comprising a counter bore having at least one vent; and
    the piston shaft traversing a ring comprising a seal element,
    wherein, the ring is disposed within a cylindrical passageway axially aligned with and connecting the first and second fluid chambers and the seal element is disposed intermediate the piston shaft and the ring and wherein as the piston shaft transverses the seal element the at least one vent is alternately disposed in fluid communication with the first and second fluid chambers.

2. The piston valve of claim 1, wherein the piston shaft's first end extends into the first fluid chamber.

3. The piston valve of claim 1, wherein the seal element comprises a first seal between the outside piston shaft diameter and an inside diameter of the ring and a second seal between the passageway and an outside diameter of the ring.

4. The piston valve of claim 1 wherein the seal element comprises an angled modular back up lying adjacent an anti-extrusion ring, a modular back up lying adjacent the angled modular back up, a Y-shaped seal ring lying adjacent the modular back up, and a seal ring lying adjacent the Y-shaped seal ring.

5. The piston valve of claim 4 wherein at least one retention ring proximate the seal ring mechanically engages the ring.

6. The piston valve of claim 4 wherein the Y-shaped seal ring is made of a material chosen from the group consisting of perfluoroelastomers, fluoroelastomers, acrylonitrile butadiene, highly saturated nitrile elastomer compounds, carboxylated nitrile compounds, polyester elastomer, and ethylene propylene rubber.

7. The piston valve of claim 4 wherein the modular back up is made of a material chosen from the group consisting of polyether ether ketone, glass filled polyether ether ketone, carbon filled polyether ether ketone, polyether ketone ketone, glass filled polyether ketone ketone, mineral filled polyether ketone ketone, and carbon filled polyether ketone ketone.

8. The piston valve of claim 4 wherein the angled modular back up is made of a material chosen from the group consisting of polyether ether ketone, glass filled polyether ether ketone, carbon filled polyether ether ketone, polyether ketone ketone, glass filled polyether ketone ketone, mineral filled polyether ketone ketone, and carbon filled polyether ketone ketone.

9. The piston valve of claim 4 wherein the anti-extrusion ring is made of a material chosen from the group consisting of manganese bronze, bronze, and copper alloys.

10. The piston valve of claim 1 wherein the seal element comprises material having a hardness of between 60 and 90 on a Shore A hardness scale.

11. The piston valve of claim 1 wherein the seal element is made of a material chosen from the group consisting of perfluoroelastomers, fluoroelastomers, acrylonitrile butadiene, highly saturated nitrile elastomer compounds, carboxylated nitrile compounds, polyester elastomer, ethylene propylene rubber, polyether ether ketone, glass filled polyether ether ketone, carbon filled polyether ether ketone, polyether ketone ketone, glass filled polyether ketone ketone, mineral filled polyether ketone ketone, and carbon filled polyether ketone ketone.

12. The piston valve of claim 1 wherein the piston shaft's first end comprises a plurality of vents between the outside diameter of the piston shaft and the inside diameter of the counter bore.

13. The piston valve of claim 1 wherein the ring further comprises a bearing surface.

14. The piston valve of claim 13 wherein the bearing surface is made from a material chosen form the group consisting of SAE 660 bronze, graphite filled SAE 660 bronze, SAE 841 bronze, and bronze alloys.

15. The piston valve of claim 1 wherein the piston shaft's second end comprises an area between 5 and 15 times the area of the piston shaft's first end.

16. The piston valve of claim 1, wherein the piston is incorporated into a high pressure high temperature apparatus.

* * * * *